United States Patent
Post

[11] Patent Number: 5,883,499
[45] Date of Patent: Mar. 16, 1999

[54] METHOD FOR LEVELING THE POWER OUTPUT OF AN ELECTROMECHANICAL BATTERY AS A FUNCTION OF SPEED

[75] Inventor: Richard F. Post, Walnut Creek, Calif.

[73] Assignee: The Regents of the University of California, Oakland, Calif.

[21] Appl. No.: 688,663

[22] Filed: Jul. 29, 1996

[51] Int. Cl.$^6$ ....................................... H02K 7/02
[52] U.S. Cl. ................................. 322/4; 318/254
[58] Field of Search .............................. 322/4, 7, 20, 21, 322/29, 32; 307/105; 318/254

[56] References Cited

U.S. PATENT DOCUMENTS

| | | | |
|---|---|---|---|
| 4,622,510 | 11/1986 | Cap ............................................. | 320/1 |
| 4,724,333 | 2/1988 | Hedin ....................................... | 307/105 |
| 4,843,513 | 6/1989 | Edris ......................................... | 361/20 |
| 4,939,486 | 7/1990 | Bergdahl et al. ....................... | 333/175 |
| 4,959,573 | 9/1990 | Roberts ................................... | 310/68 R |
| 5,300,870 | 4/1994 | Smith ....................................... | 318/768 |
| 5,323,304 | 6/1994 | Woodworth ............................. | 363/47 |
| 5,367,197 | 11/1994 | Klerfors .................................. | 307/105 |
| 5,387,821 | 2/1995 | Steciuk et al. .......................... | 307/105 |
| 5,402,052 | 3/1995 | Cheng et al. ............................ | 318/696 |
| 5,525,894 | 6/1996 | Heller ...................................... | 322/20 |
| 5,705,902 | 1/1998 | Merritt et al. .......................... | 318/254 |

*Primary Examiner*—Nestor Ramirez
*Assistant Examiner*—Nicholas Ponomarenko
*Attorney, Agent, or Firm*—John P. Wooldridge

[57] ABSTRACT

The invention is a method of leveling the power output of an electromechanical battery during its discharge, while at the same time maximizing its power output into a given load. The method employs the concept of series resonance, employing a capacitor the parameters of which are chosen optimally to achieve the desired near-flatness of power output over any chosen charged-discharged speed ratio. Capacitors are inserted in series with each phase of the windings to introduce capacitative reactances that act to compensate the inductive reactance of these windings. This compensating effect both increases the power that can be drawn from the generator before inductive voltage drops in the windings become dominant and acts to flatten the power output over a chosen speed range. The values of the capacitors are chosen so as to optimally flatten the output of the generator over the chosen speed range.

6 Claims, 2 Drawing Sheets

METHOD FOR LEVELING THE POWER OUTPUT OF AN ELECTROMECHANICAL BATTERY AS A FUNCTION OF SPEED

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to improvements in the electromechanical battery, and more specifically, it relates to a method for leveling the power output of an electromechanical battery during its discharge.

2. Description of Related Art

Efficient and cost-effective means for storing electrical energy is becoming an increasing need in our electricity-oriented society. For electric utilities an emerging need is for distributed storage systems, that is, energy storage at substations, at solar or wind-power sites, or for load-leveling at the site of major consumers of their electricity. One of the important consequences of distributed storage for the utilities would be the reduction in transmission losses that would result from having a local source of load-leveling power. For the transportation sector the need for energy storage, now acute, is for better batteries to power electric vehicles. These diverse uses are becoming increasingly important as we move toward the use of alternate energy sources.

One answer to the entire spectrum of energy storage needs just outlined is the "electromechanical battery". The E-M battery has the potential to solve both of the above energy storage problems in a manner superior to the electrochemical battery in all important attributes: energy storage density (kWh/kg), power density (kW/kg), energy recovery efficiency, cycle lifetime, and amortized capital cost.

An electromechanical battery is an energy storage module consisting of a high-speed rotor, fabricated from fiber composite, and having an integrally mounted generator/motor. The rotor operates at high speed, in vacuum, inside of a hermetically sealed enclosure, supported by a "magnetic bearing", that is, a bearing that uses magnetic forces to support the rotor against gravity. Magnetic bearings are a virtual necessity for the E-M battery in order to achieve long service life, and to minimize frictional losses so that the battery does not lose its charge (run down) too rapidly. These considerations mitigate against the use of conventional mechanical bearings in the E-M battery for most applications.

The E-M battery has much to contribute in the area of improving the efficiency of both stationary and vehicular systems. For example, many electrical utilities utilize "pumped hydro" energy storage systems as a means of improving the utilization of their "base-load" power plants. That is, electrical energy is stored during off-peak hours for delivery at times of peak usage. These pumped hydro systems employ upper and lower reservoirs, between which water is shuttled to store and recover the energy. Of necessity, pumped hydro storage facilities are located in mountainous areas, usually far, both from the urban centers where power uses are concentrated, and from the sites of the power plants themselves, increasing the transmission line losses that subtract from the useful energy. More importantly, pumped hydro systems themselves only return from 65 to 70 percent of the electrical energy input required to pump the water from the lower reservoir to the upper one. Thus, including the extra transmission losses, of order 40 percent of the input electrical energy is wasted in every cycle of use of the facility. For a (typical) pumped hydro system capable of accepting 5000 Megawatt-hours of input energy, this would represent a direct loss of 2000 Megawatt-hours of electrical energy per diurnal cycle of use.

Contrast the above situation with that offered by the E-M battery. First, banks of such batteries could be used at locations throughout the electrical grid, thereby reducing transmission losses. Second, instead of a 65 to 70 percent "turnaround efficiency", E-M batteries can demonstrate efficiencies in excess of 90 percent. The long-term payback of such an increase of efficiency is obvious: Over a 20-year period (the expected life of a well-designed E-M battery), the energy cost savings from replacing an overall 60 percent efficient 5000 Megawatt-hour storage system with a distributed energy storage system with 90 percent turnaround efficiency is substantial: For a system cycled 300 times in a year, with electrical energy costing, say, $0.05/kwh, the 20-year savings would amount to $450 million. This amount of money is comparable to the original cost of the storage system itself.

The efficiency gains of using the E-M battery instead of conventional electrochemical batteries in an all-electric vehicle are equally dramatic: Ordinary batteries return only 60 to 70 percent of their charging energy input as electrical output. Despite this, by employing so-called "regenerative braking" (putting the kinetic energy recovered from braking back into the batteries), in urban driving cycles, owing to the higher efficiency of its drive train, an electric auto using conventional batteries should require only about 40 percent as much primary energy input as an equivalent-sized gasoline-powered automobile. That is to say, it can be calculated that it would require the energy equivalent of 2.5 barrels of oil delivered to the refinery to equal the urban driving range that one barrel of oil (or its energy equivalent) would give if delivered to the electrical utility to generate the electrical energy to charge up the electric vehicle.

If the same calculation is made, using the E-M battery and its higher turnaround efficiency in the evaluation, a factor of 4.5 to 5.0 is realized, instead of 2.5, that is, a further improvement of nearly a factor of two is predicted. This result would not only mean a near doubling of the urban driving range of the electric auto for the same battery storage capacity, but, more importantly for the nation, it would mean a major reduction in the need for energy for automobile transportation, and with it, a major reduction in the air pollution caused by that sector.

From these examples, it seems clear to that the successful development of the E-M battery could have a major impact on diverse energy-intensive activities of our modern civilization.

SUMMARY OF THE INVENTION

It is an object of the present invention to provide a method and apparatus that levels the power output of an electromechanical battery during its discharge.

It is also an object of the present invention to insert capacitors in series with each phase of the windings of an electromechanical battery to introduce capacitative reactances that act to compensate the inductive reactance of these windings.

The invention levels the power output of an electromechanical battery during its discharge, while at the same time maximizing its power output into a given load. The method employs the concept of series resonance, employing a capacitor the parameters of which are chosen optimally to achieve the desired near-flatness of power output over any chosen charged-discharged speed ratio.

Both power flattening and maximized power output from the E-M battery are related to the use of a generator that employs a Halbach Array. The magnetic field produced by the rotating Halbach array induces currents in multi-phase windings located within the array. In the extraction of stored energy from the flywheel system the speed of the flywheel rotor decreases as energy is withdrawn, resulting in a decrease in the voltage induced in the windings. In addition, the self-inductance of the windings limits the power that can be withdrawn from them, this limitation becoming more severe as the speed of the rotor decreases.

In the present invention, capacitors are inserted in series with each phase of the windings to introduce capacitative reactances that act to compensate the inductive reactance of these windings. This compensating effect both increases the power that can be drawn from the generator before inductive voltage drops in the windings become dominant and acts to flatten the power output over a chosen speed range. The values of the capacitors are chosen so as to optimally flatten the output of the generator over the chosen speed range.

In practical cases it will be found not only that power leveling can be achieved, but that the power obtainable from the generator will be higher when using the teachings of this invention than it would be without the use of the compensating condensers. In our optimized cases other limits, such as heating of the windings during a pulse of output power will establish the upper limit to the power. Such a situation is much to be preferred to one where the power output not only droops with slowing of the flywheel, but also that its upper limit is set by parameters other than the intrinsic resistance of the generator windings.

Accordingly, the invention includes a method of leveling the power output of an electromechanical battery (EMB) during its discharge. An apparatus for leveling the power output of an electromechanical battery (EMB) during its discharge is also provided. A capacitor is inserted in series with each phase of the windings of the generator of the EMB. This capacitor introduces capacitive reactances that act to compensate the inherent inductive reactance of the windings, which provides a compensating effect that increases power that can be drawn from the EMB before inductive voltage drops in the windings become dominant and elevates the power output over a chosen speed range. The values of the capacitor is selected such that its resonant frequency and the inductance of the windings lie below the peak operating frequency of the generator. The power output may be leveled between an upper and a lower speed limit provided $R_G$ satisfies the condition that $\epsilon(1-\epsilon)^{1/2}\omega_0 L_G > R_G$ and the following conditions are solved simultaneously $$\frac{L_G}{C} = \lambda^2 R_G^2 = \frac{R_G^2 \left[1 + \frac{R_L}{R_G}\right]^2}{1 - \epsilon^2}$$

$$L_G C = \frac{1}{\omega_0^2} = \frac{1}{\epsilon^2 \omega_0^2}$$

where $R_G$ is generator resistance, $R_L$ is the load resistance, C is the value of said at least one capacitor, $$\epsilon = \omega_R/\omega_0 < 1, \omega_R = \sqrt{\frac{1}{L_G C}} \text{ radians/sec.,}$$

$\omega_0$ is the rotation speed (in radians per second) at full charge, $L_G$ is the inductance of the each of the multi-phase windings of the generator and $\lambda$ is the ratio of the intrinsic impedance of the L-C circuit to the generator resistance.

DETAILED DESCRIPTION OF THE INVENTION

The possibility of accomplishing both power flattening and maximized power output from the E-M battery is intimately related to the use of an iron-less, permanent-magnet-excited, generator/motor that employs a Halbach Array in its design. This use of the Halbach array is described in the U.S. Pat. No. 5,705,902 entitled "Halbach Array DC Motor / Generator" incorporated herein by reference. In the usage therein described the magnetic field produced by the rotating Halbach array induces currents in multi-phase windings located within the array. In the extraction of stored energy from the flywheel system the speed of the flywheel rotor decreases as energy is withdrawn, resulting in a decrease in the voltage induced in the windings. In addition, the self-inductance of the windings limits the power that can be withdrawn from them, this limitation becoming more severe as the speed of the rotor decreases.

In the invention herein described capacitors are inserted in series with each phase of the windings to introduce capacitative reactances that act to compensate the inductive reactance of these windings. This compensating effect both increases the power that can be drawn from the generator before inductive voltage drops in the windings become dominant and, as shown in the invention, acts to flatten the power output over a chosen speed range. By following the design principles described herein the values of the capacitors are chosen so as to optimally flatten the output of the generator over the chosen speed range.

Figure 1:
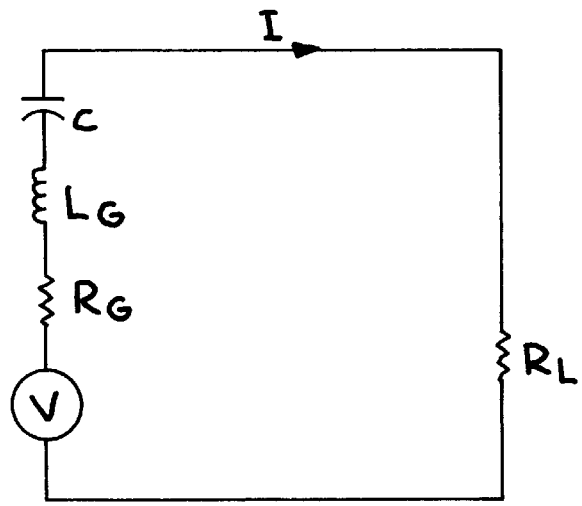
FIG. 1 shows the use of a series resonant cirsuit to compensate for a power drop.

In FIG. 1, $L_G$ and $R_G$ are the inductance and the resistance of the each of the multi-phase windings of the generator, respectively. V is the open circuit voltage of the generator. This voltage varies with the rotating speed of the flywheel rotor, in accordance with the equation:

$$V = V_0 \left[\frac{\omega}{\omega_0}\right],$$

Where $\omega_0$ is the rotation speed (in radians per second) at "full charge" of the flywheel rotor, and $V_0$ is the open-circuit voltage delivered by each phase of the generator windings at that speed.

Figure 2:
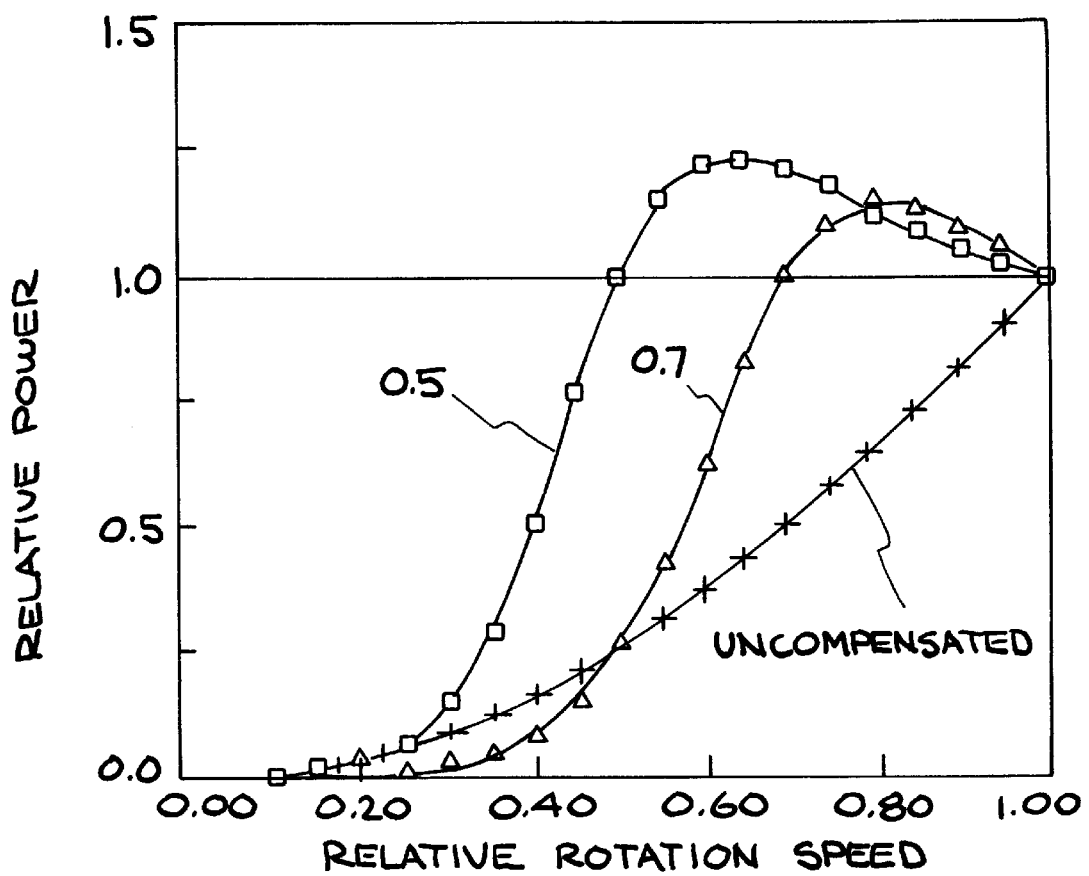
FIG. 2 depicts flattening of power output as a function of rotation speed.

FIG. 2 shows the degree of flattening achieved for two different discharged-charged speed ratios (0.5 and 0.7), as compared with an uncompensated case. As can be seen, the power is maintained within plus or minus a few percent over the discharge cycle with the series resonant circuit, as compared to power variations of two or three to one in the uncompensated case.

The electromechanical battery (EMB) consists of a high-speed flywheel with an integral motor/generator suspended on magnetic bearings and in an evacuated housing. For practical use, a set of power electronics is coupled to this module. The flywheel and its motor/generator is a means for energy storage and extraction; the power electronics conditions electrical energy, both for adding energy to and extracting energy from the flywheel. Since the goal is to mimic a battery, the input/output voltage to the power electronics is typically dc, although ac-based systems can also be contemplated, using so-called cycloconverters, or the multi-phase devices called matrix converters.

Figure 3:
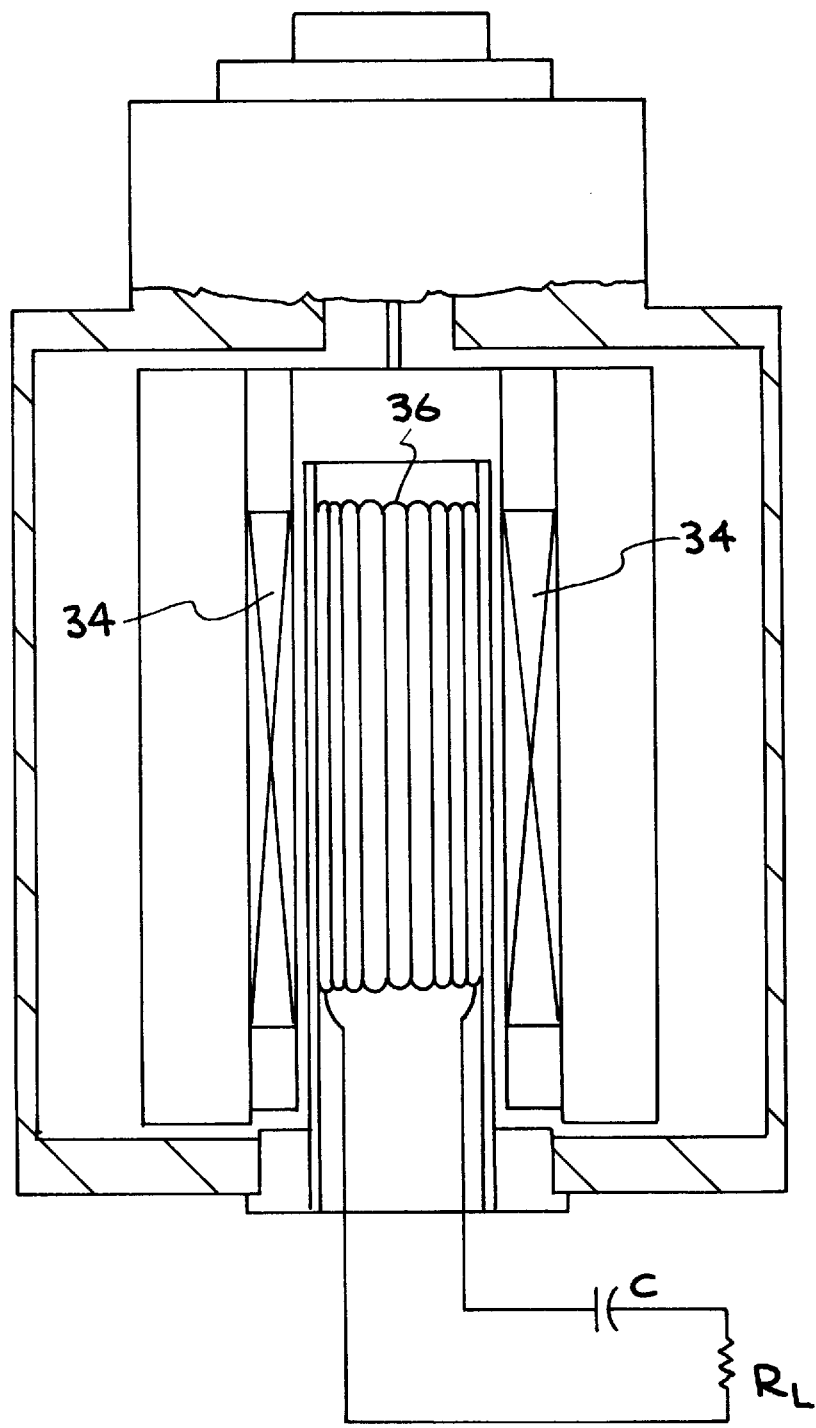
FIG. 3 shows an electromechanical Battery.

As can be seen in FIG. 3, the Halbach array machine is an integral part of the flywheel construction. The array of magnets 34 is designed into the rotor; the mass of the magnets is used advantageously to keep the composite material in compression. The advantages listed above are also utilized in this design. The outer diameter of the stator windings 36 are typically a centimeter smaller than the inner diameter of the Halbach array magnets 34. In this space, a thin vacuum barrier is placed, still allowing for a substantial clearance between the array and the barrier. This clearance simplifies the design of the bearing/suspension system, which need not constrain the radial displacements of the rotor assembly to the fraction-of-a-millimeter tolerances that would be required in a conventional iron-core machine.

A summary of the design parameters of one modular EMB follows.

TABLE 1

Electromechanical Battery Parameters

| | |
|---|---|
| Useful Energy (100% to 50% speed) | 0.6 kW-hr |
| Max Speed | 84,000 RPM |
| Peak Power | 50 kW |
| Open Circuit Voltage | 151 Vrms/phase at max speed |
| Halbach Array Length | 18 cm |
| Halbach Array Outer Diameter | 10.5 cm |
| Halbach Array Inner Diameter | 7 cm |
| Winding - Turns/phase | 6 |
| Conductor size | 1700 strand, #40 Litz |
| Inductance per phase | 7.4 microhenries |
| Resistance per phase | 10.8 milliohms |

The generator whose output power is to be flattened is assumed to be delivering power into a load that is resistive in nature, i.e., one of unity power factor. This type of load is representive of loads encountered in the use of flywheel energy storage. Considering each winding separately, this load can be visualized as being composed of three equvalent load resistors, each with resistance $R_L$ ohms, one of which is connected across each winding. For example, with a 3-phase winding, the ohmic value of the equivalent load resistor would be 3 times the value of the resistance of the actual load, reflecting the fact that 3 equal resistances in parallel result in a resistance that is one-third the value of those individual resistors. From circuit analysis the power delivered to an equivalent load resistor by each phase of the generator windings is given by the equation:

$$P_L = R_L V^2 \left\{ \frac{1}{(R_G + R_L)^2 + (\omega L_G - 1/\omega C)^2} \right\} \text{ Watts}$$

As can be seen from the equation, the maximum power that can be extracted at a given voltage from the generator occurs at the resonant point, that is the rotation frequency where the term $(\omega L_G - 1/\omega C)$ becomes equal to zero, owing to the exact compensation of the inductive reactance of the generator winding by the capacitative reactance of the series capacitor. The resonant frequency, $\omega_R$, is therefore defined by the following equation:

$$\omega_R = \sqrt{\frac{1}{L_G C}} \text{ radians/sec.}$$

To accomplish the result desire in this invention it is then necessary to specially chose the value of the capacitor (or capacitors) so that the output power of the variable frequency, variable voltage, generator that is a part of the flywheel energy storage system is held nearly constant over the desired range of speed of the flywheel rotor.

Further analysis of the problem with the constraint the power output is to be made equal to the same value at both the upper and the lower end of the speed range over which the flywheel is to operate shows that the resonant frequency should be chosen to lie at the lower end of the speed range. We will define this range through the relationship $\epsilon = \omega_R / \omega_0 < 1$, where $\omega_0$ is the frequency at the upper end of the speed range.

The analysis yields the following equation for the power output as a function of frequency:

$$P_L = \frac{V_0^2}{R_G} F[R_L/R_G, \omega/\omega_0, \epsilon, \lambda] \text{ Watts,}$$

where the parameter $\lambda$ measures the ratio of the intrinsic impedance of the L-C circuit, $Z = \sqrt{L_G/C}$ to the generator resistance, $R_G$, i.e., $Z = \lambda R_G$. In terms of these parameters the function F takes the form:

$$F[R_L/R_G, \omega/\omega_0, \epsilon, \lambda] = \frac{(R_L/R_G)(\omega/\omega_0)^2}{[(1 + R_L/R_G)^2 - 2\lambda^2] + \lambda^2[(1/\epsilon^2)(\omega/\omega_0)^2 + \epsilon^2(\omega_0/\omega)^2]}$$

If we now require that the power level should be the same value at the upper and lower limits of the operating speed we will obtain an equation that defines the optimized value of the parameter $\lambda$ and the value of the capacitance C required to yield the desired result. The equation for the optimized value of $\lambda$ is:

$$\lambda = \frac{[1 + R_L/R_G]}{\sqrt{1 - \epsilon^2}}$$

Inserting the optimized value of $\lambda$ into the expression for the power output yields the final equation for the optimized power output, i.e., the equation defining the case where the power output is the same at both extremes of the operating speed range, rising minimally between the two extremes. This equation is:

$$P_L = \frac{V_0^2}{R_G} \left[ \frac{R_L/R_G}{(1 + R_L/R_G)^2} \right] \left\{ \frac{(1 - \epsilon^2)(\omega/\omega_0)^2}{[(1/\epsilon^2)(\omega/\omega_0)^2 + \epsilon^2(\omega_0/\omega)^2] - [1 + \epsilon^2]} \right\}$$

This equation was used to derive the power vs frequency curves shown in FIG. 2, for the cases $\epsilon = 0.5$ and $\epsilon = 0.7$. In all curves the power curve has been normalized to 1.0 at the upper frequency point. At both the upper and lower limits the value of the power is then given by the expression:

$$P_L = \frac{V_0^2}{R_G} \left[ \frac{R_L/R_G}{(1 + R_L/R_G)^2} \right] \epsilon^2 \quad \text{Watts}$$

For comparison, an uncompensated case is shown, i.e., one in which no series capacitor is present.

The designer, in order to achieve the conditions required to flatten the power according to the teachings of this invention then will proceed as follows:

The designer will first tentatively establish the range over which he intends to level the power. He will then use the inductance of the windings to calculate the required value of the capacitors to be used. He will then establish the power output level that it is desired to achieve, thereby determining the load resistance (assuming the generator output voltage is known). These values will then permit the determination of the relative impedance parameter, λ. If this determination does not yield a value close to the required value the designer may then either choose a different value for $\epsilon$, change the design of the stator windings, change the number of phases (thus modifying the inductance and resistance of the windings) or adjust the power level requirements, in order to satisfy the design criteria defined above. In this way it will always be possible to find a set of parameters that is optimum for the particular situation at hand, given the fundamental limits imposed by conductor resistivity and other parameters that will define the maximum power achievable from a given generator configuration.

In all practical cases it will be found not only that power leveling can be achieved, but that the power obtainable from the generator will be higher when using the teachings of this invention than it would be without the use of the compensating condensers. In our optimized cases other limits, such as heating of the windings during a pulse of output power will establish the upper limit to the power. Such a situation is much to be preferred to one where the power output not only droops with slowing of the flywheel, but also that its upper limit is set by parameters other than the intrinsic resistance of the generator windings.

As suggested by the above description, there are constraints on the parameter space within which it is possible to achieve the optimal degree of power leveling that is possible using the teachings of this invention. However, even if the generator and load parameters are not such as take full advantage of the benefits of the teachings, nevertheless, the introduction of series capacitors of such a value as to cause resonance at frequencies below the highest operating speed of the generator will always increase the power output at those frequencies relative to what would be obtained with no capacitors. Under such conditions the power at the lower frequencies will be enhanced, but not to the degree that it rises to equality with the power at the peak speed.

The analysis yields a condition on the inductive reactance of the winding, that is, on the product of the peak angular frequency, $\omega_0$, and the generator winding inductance, $L_G$, relative to the generator resistance, $R_G$. When this condition is satisfied the full benefit of the teachings of this invention can be realized; when it is not full leveling is not possible, but power enhancement is still possible. This condition is:

$$\epsilon(1-\epsilon)^{1/2}\omega_0 L_G > R_G.$$

Since the maximum value of the term $\epsilon(1-\epsilon)^{1/2}$ is $\sqrt{2}$, occuring at $\epsilon=\sqrt{1/2}=0.707$, the criterion cannot be satisfied for any value of $\epsilon$ unless the following limiting condition is met:

$$\omega_0 L_G > \sqrt{2}\, R_G$$

As an example of the application of the teachings of this invention to an actual case, the following is given: In an EMB with a three-phase stator winding the inductance of the winding of each phase is 48.3 microhenrys and its resistance is 36.3 milliohms. The EMB is designed to operate over a speed range of 30,000 RPM to 60,000 RPM, driving a generator that uses a dipole Halbach array to create the rotating field. The intended generator output frequency range is therefore 1000 Hz to 500 Hz ($\epsilon=0.5$).

The product $\omega_0 L_G$ is equal to 303. milliohms, i.e., it is substantially larger than $\sqrt{2}R_G=51.3$ milliohms so that the criterion given above can be satisfied over a range of values of $\epsilon$, including the desired value, $\epsilon=0.5$.

Changes and modifications in the specifically described embodiments can be carried out without departing from the scope of the invention, which is intended to be limited by the scope of the appended claims.

I claim:

1. A method of leveling the power output of an electromechanical battery (EMB) during its discharge, comprising:
    inserting at least one capacitor in series with each phase of the windings of the generator of said EMB, wherein said at least one capacitor introduces capacitive reactances that act to compensate the inherent inductive reactance of said windings, wherein this compensating effect (i) increases power that can be drawn from said EMB before inductive voltage drops in said windings become dominant and (ii) elevates said power output over a chosen speed range.

2. The method of claim 1, further comprising the step of choosing the value of said at least one capacitor such that the series resonant frequency of said capacitor and the inductance of said windings taken together lie below the peak operating frequency of said generator.

3. The method of claim 2, wherein said compensating effect levels said power output over a chosen speed range if $R_G$ satisfies the condition that $\epsilon(1-\epsilon)^{1/2}\omega_0 L_G > R_G$ and the following conditions are solved simultaneously $$\frac{L_G}{C} = \lambda^2 R_G^2 = \frac{R_G^2 \left[1 + \dfrac{R_L}{R_G}\right]^2}{1-\epsilon^2}$$

$$L_G C = \frac{1}{\omega_0^2} = \frac{1}{\epsilon^2 \omega_0^2}$$

where $R_G$ is generator resistance, $R_L$ is the load resistance, C is the value of said at least one capacitor, $$\epsilon = \omega_R/\omega_0 < 1,\ \omega_R = \sqrt{\frac{1}{L_G C}}\ \text{radians/sec.,}$$

$\omega_0$ is the rotation speed (in radians per second) at full charge, $L_G$ is the inductance of the each of the multi-phase windings of the generator and λ is the ratio of the intrinsic impedance of the L-C circuit to the generator resistance.

4. An apparatus for leveling the power output of an electromechanical battery (EMB) during its discharge, comprising at least one capacitor in series with each phase of the windings of the generator of said EMB, wherein said at least one capacitor introduces capacitive reactances that act to compensate the inherent inductive reactance of said windings, wherein this compensating effect (i) increases power that can be drawn from said EMB before inductive voltage drops in said windings become dominant and (ii) elevates said power output over a chosen speed range.

5. The apparatus of claim 4, wherein the value of said at least one capacitor is chosen such that the resonant frequency of said capacitor and the inductance of said windings taken together lie below the peak operating frequency of said generator.

6. The apparatus of claim 5, wherein said compensating effect levels said power output over a chosen speed range if $R_G$ satisfies the condition that $\epsilon(1-\epsilon)^{1/2}\omega_0 L_G > R_G$ and the following conditions are solved simultaneously $$\frac{L_G}{C} = \lambda^2 R_G^2 = \frac{R_G^2 \left[1 + \frac{R_L}{R_G}\right]^2}{1 - \epsilon^2}$$

$$L_G C = \frac{1}{\omega_0^2} = \frac{1}{\epsilon^2 \omega_0^2}$$

where $R_G$ is generator resistance, $R_L$ is the load resistance, C is the value of said at least one capacitor, $$\epsilon = \omega_R/\omega_0 < 1, \omega_R = \sqrt{\frac{1}{L_G C}} \text{ radians/sec.,}$$

$\omega_0$ is the rotation speed (in radians per second) at full charge, $L_G$ is the inductance of the each of the multi-phase windings of the generator and $\lambda$ is the ratio of the intrinsic impedance of the L-C circuit to the generator resistance.

* * * * *